United States Patent
Mulhim et al.

(10) Patent No.: US 11,401,796 B2
(45) Date of Patent: Aug. 2, 2022

(54) SYSTEM AND METHOD FOR ACQUIRING WELLBORE DATA

(71) Applicant: SAUDI ARABIAN OIL COMPANY, Dhahran (SA)

(72) Inventors: Abdulrahman K. Mulhim, Udhailiyah (SA); Hemant K. Sharma, Udhailiyah (SA); Ahmad M. Mousa, Mubarraz (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 20 days.

(21) Appl. No.: 16/938,017

(22) Filed: Jul. 24, 2020

(65) Prior Publication Data

US 2022/0025757 A1    Jan. 27, 2022

(51) Int. Cl.
*E21B 47/00*    (2012.01)
*E21B 23/03*    (2006.01)
(Continued)

(52) U.S. Cl.
CPC ............. *E21B 47/00* (2013.01); *E21B 23/03* (2013.01); *E21B 47/01* (2013.01); *E21B 47/12* (2013.01);
(Continued)

(58) Field of Classification Search
CPC .......... E21B 47/00; E21B 47/01; E21B 47/12; E21B 47/13; E21B 23/03; E21B 49/00;
(Continued)

(56) References Cited

U.S. PATENT DOCUMENTS 9,297,253 B2 *  3/2016  Hiorth ................... E21B 17/028
9,394,785 B2 *  7/2016  Goodwin .............. E21B 47/005
(Continued)

FOREIGN PATENT DOCUMENTS

JP    2019052445 A    4/2019
WO   2011097063 A2    8/2011

OTHER PUBLICATIONS

International Search Report and Written Opinion issued in Application No. PCT/US2020/044504, dated Feb. 24, 2021 (14 pages).

*Primary Examiner* — Franklin D Balseca
(74) *Attorney, Agent, or Firm* — Osha Bergman Watanabe & Burton LLP (57) ABSTRACT

A system for acquiring data in a well may have a tubing placed therein. The system may include a pass-through device. The pass-through device may include a cylindrical housing having a central aperture extending through the cylindrical housing along a central axis thereof. The pass-through device may include a first sensor mounted on the cylindrical housing. The pass-through device may include a first communication device mounted on the cylindrical housing and operatively connected to the first sensor. The system may include a tubing mounting structure secured to the tubing and configured to hold the pass-through device at a desired location within the tubing. The system may include a control device. The control device may include a second communication device configured to communicate with the first communication device. The control device includes a processor operatively connected to the second communication device.

20 Claims, 9 Drawing Sheets

(51) Int. Cl.
*E21B 47/01* (2012.01)
*E21B 47/12* (2012.01)
*E21B 49/00* (2006.01)
*H04Q 9/00* (2006.01)

(52) U.S. Cl.
CPC .............. *E21B 49/00* (2013.01); *H04Q 9/00* (2013.01); *E21B 2200/20* (2020.05); *H04Q 2209/40* (2013.01)

(58) Field of Classification Search
CPC ... E21B 2200/20; H04Q 9/00; H04Q 2209/40
See application file for complete search history.

(56) References Cited

U.S. PATENT DOCUMENTS

| | | | |
|---|---|---|---|
| 9,771,792 B2* | 9/2017 | Xu | .......................... H04L 27/28 |
| 10,408,047 B2 | 9/2019 | Morrow | |
| 2011/0232917 A1 | 9/2011 | Skinner et al. | |
| 2012/0152562 A1 | 6/2012 | Newton et al. | |
| 2014/0111347 A1 | 4/2014 | Slapal et al. | |
| 2014/0354443 A1 | 12/2014 | Roberson et al. | |
| 2016/0090834 A1 | 3/2016 | Morrow et al. | |
| 2018/0155991 A1 | 6/2018 | Arsalan et al. | |
| 2018/0156013 A1 | 6/2018 | Arsalan et al. | |
| 2018/0230777 A1 | 8/2018 | Bridges et al. | |
| 2019/0271227 A1 | 9/2019 | Peters et al. | |
| 2020/0081148 A1* | 3/2020 | Capoglu | ................ E21B 47/00 |
| 2020/0362691 A1* | 11/2020 | Joshi | ....................... E21B 47/07 |

\* cited by examiner

SYSTEM AND METHOD FOR ACQUIRING WELLBORE DATA

BACKGROUND

Obtaining wellbore data for production in hydrocarbon fields conventionally requires using costly rig operations at a well location. These operations usually require bringing a rig to the well location and installing a tubing equipped with permanent downhole monitoring systems or a thru-tubing retrievable intelligent completion system requiring additional removal for intervention jobs. As such, obtaining wellbore data causes production in a well to stop when wellbore data must be obtained. Specifically, production stops to allow new tubing to be installed for sampling data in the well.

SUMMARY

In general, in one aspect, embodiments disclosed herein relate to a system for acquiring data in a well having a tubing placed therein. The system includes a pass-through device. The pass-through device includes a cylindrical housing having a central aperture extending through the cylindrical housing along a central axis thereof. The pass-through device includes a first sensor mounted on the cylindrical housing. The pass-through device includes a first communication device mounted on the cylindrical housing and operatively connected to the first sensor. The system includes a tubing mounting structure secured to the tubing and configured to hold the pass-through device at a desired location within the tubing. The system includes a control device. The control device includes a second communication device configured to communicate with the first communication device. The control device includes a processor operatively connected to the second communication device. The system includes an output device operatively connected to the processor and configured to provide a desired representation of data sensed by the first sensor.

In general, in one aspect, embodiments disclosed herein relate to a method for acquiring data in a well having a tubing placed therein. The method includes installing a pass-through device at a desired location within the tubing. The pass-through device includes a cylindrical housing having a central aperture extending through the cylindrical housing along a central axis thereof. The pass-through device includes a first sensor mounted on the cylindrical housing. The pass-through device includes a first communication device mounted on the cylindrical housing and operatively connected to the first sensor. The method includes communicating data sensed by the first sensor from the first communication device to a second communication device operatively connected to a control device. The method includes outputting a desired representation of data sensed by the first sensor.

In general, in one aspect, embodiments disclosed herein relate to a pass-through device for acquiring data in a well having a tubing placed therein and for communicating acquired data to a control device. The pass-through device includes a cylindrical housing having a central aperture extending through the cylindrical housing along a central axis thereof and a housing mounting structure configured to selectively engage a tubing mounting structure. The pass-through device includes a first sensor configured to collect data sensed inside the central aperture. The pass-through device includes a second sensor configured to collect data sensed outside the cylindrical housing. The pass-through device includes a processor operatively connected to the first sensor and the second sensor. The pass-through device includes a memory that stores data sensed by the first sensor and the second sensor. The pass-through device includes a power supply. The pass-through device includes communication device that communicated data sensed by the first sensor and the second sensor to the control device.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 2.1 shows a schematic diagram of a pass-through device in accordance with one or more embodiments.

FIG. 2.2 shows a cross-section view of a tubing nipple in accordance with one or more embodiments.

FIG. 2.3 shows a schematic diagram of an intervention tool in accordance with one or more embodiments.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system and a method for acquiring wellbore data. The wellbore data may be acquired using pass-through capabilities that do not force well operators to retrieve a device to embark on intervention jobs during data collection. In some embodiments, the system and the method may include a device disposed in a well allowing access downhole into the wellbore through a central aperture extending the entire length of the device along a central axis. In some embodiments, the system and the method may provide accessibility to the wellbore by using slim wireline tools or sampling tools on a slickline through the central aperture of the device. In this regard, the system and the method provide tools downhole into the wellbore without a need to leave any of the tools in place for retrieving at a later date.

In one or more embodiments, the device is a pass-through wellbore data acquisition system allowing collection of data during hydrocarbon production and without mounting a rig at the well location. In some embodiments, the device may be cylindrical in shape and additional tools, devices, and fluids may pass through a central aperture. In some embodiments, the central aperture is a hollow space in the device that allows conventional intervention procedures to access downhole into the wellbore while keeping the device fixed and intact at a specific tubing portion of the wellbore. In some embodiments, the device may be kept in place using a tubing nipple profile. In addition, the device may be equipped with a communication system for transmitting data to a surface panel (i.e., a well control system located on the surface). In some embodiments, the surface panel may also provide instructions to the device for collecting the data.

In some embodiments, the system and the method may be implemented for providing conventional hydrocarbon producing wells with intelligent tracking and collecting tools. These tools may improve the hydrocarbon production of the well by reducing maintenance checks, downtime, or operational restrictions. As such, the system and the method provide the well with a range of accessibility mechanisms for future well intervention and maintenance.

Figure 1:
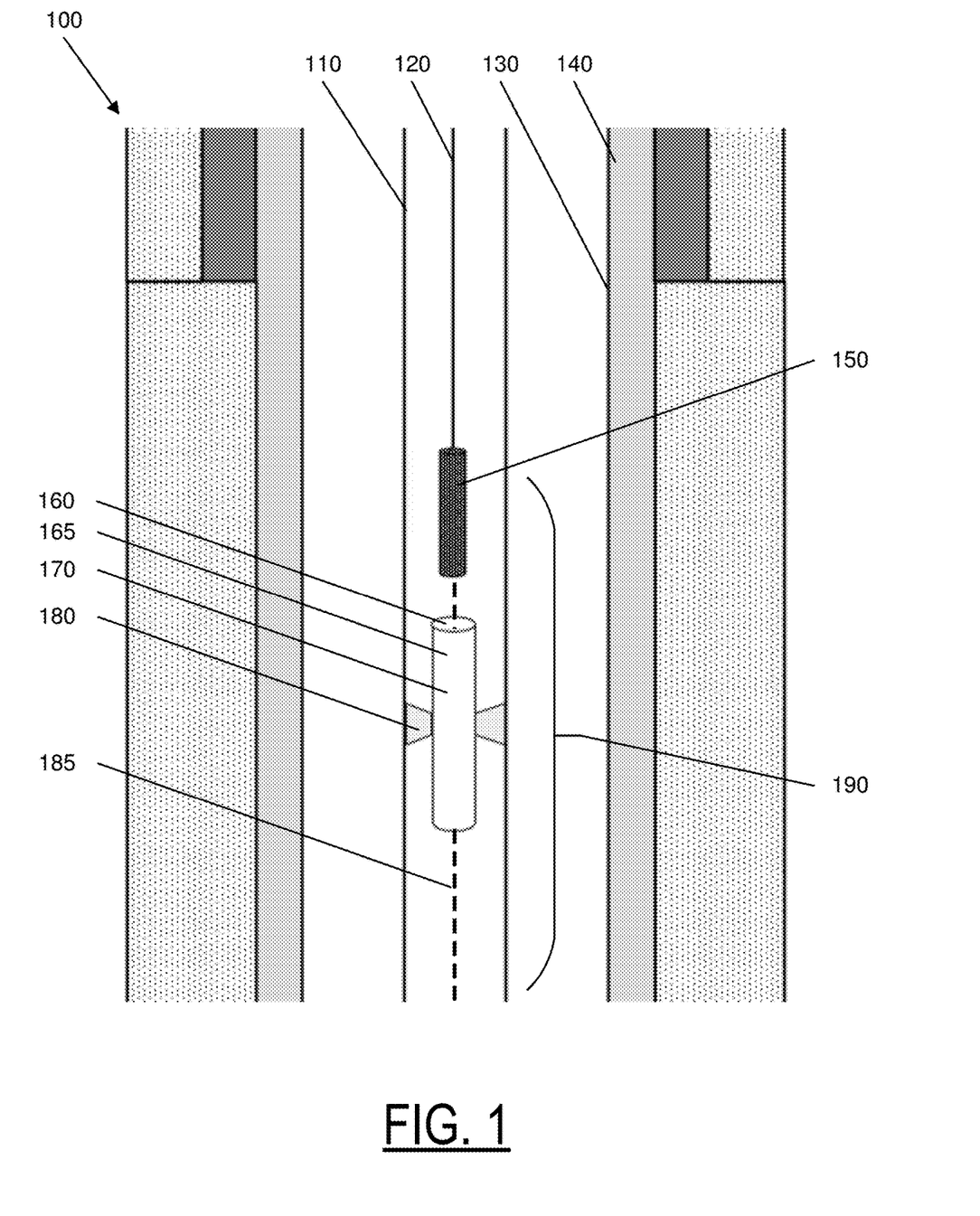
FIG. 1 shows a schematic diagram of a system including a pass-through device in accordance with one or more embodiments.

FIG. 1 shows a schematic diagram illustrating a pass-through data acquisition system 100 disposed on a wellbore 130 of a well system 300. The pass-through data acquisition system 100 includes a device 170 configured to collect, process, and transmit wellbore data. The device 170 has a cylindrical housing 165 with a central aperture 160 that extends through the entire length of the device 170 along a central axis 185. As such, the device 170 may be a pass-through device. In some embodiments, the device 170 may be disposed on a tubing nipple 180, which maintains the device 170 at a fixed position in the tubing 110. In some embodiments, the tubing nipple 180 may be installed at a tubing portion 190 of the tubing 110. In some embodiments, the tubing portion 190 may be a section of the tubing 110 where the device 170 may collect data from the wellbore 130 (i.e., a desired location within the tubing 110).

In some embodiments, the device 170 may exchange information with a surface panel while avoiding the need to bring a rig to a well location to install tubing equipped with permanent downhole monitoring systems or thru-tubing retrievable intelligent completion systems. Such systems normally require removal for intervention jobs. A well intervention is any operation carried out on a hydrocarbon (i.e., oil and gas) well during or at the end of the production life of the well. Well intervention may function to alter the state of the hydrocarbon well and/or well geometry for providing well diagnostics or management of the production of the well. Well intervention jobs include, for example, pumping jobs, maintenance jobs, slickline jobs, coiled tubing jobs, perforation jobs, and workover jobs.

In some embodiments, the central aperture 160 of the device 170 allows normal flow of the well and also permits conventional intervention practices using intervention tools such as intervention tool 150 via wireline or slickline mechanisms (i.e., the device 170 can be used by any type of conveyance, such as conveyance mechanism 120) and use only that.) In some embodiments, the intervention tool 150 may include temperature sensors, pressure sensors, batteries, instrumentation devices, or wireless communication capabilities. In some embodiments, the device 170 may allow intervention tool 150 to acquire real-time downhole wellbore data relevant to hydrocarbon production.

The intervention tool 150 may include sensors and systems for collecting data relating to the well. In some embodiments, the intervention tool 150 may include hardware and/or software for creating a secure wireless connection (i.e., a communication link) with the surface panel to insure real-time data exchanges and compliance with data protection requirements. In some embodiments, the intervention tool 150 may create another secure wireless connection with the device 170 to exchange data and to process collected data.

In one or more embodiments, the tubing nipple 180 may be any piece of pipe threaded at both ends with male threads. The tubing nipple 180 may be a completion component fabricated as a short section of heavy wall tubular with a machined internal surface that provides a seal area and a locking profile. In some embodiments, the tubing nipple 180 may be a landing nipple included in a completion of a well. In some embodiments, the tubing nipple 180 may be a tubing mounting structure such as a selective-landing nipple or a ported or safety-valve nipple. In some embodiments, the selective landing nipple may be a type of landing nipple designed to be run in a series throughout the wellbore 130. In some embodiments, two types of selective nipple systems may be a nipple series in which the nipple design or profile determines the selectivity of running tools going through the nipple and one in which any running tools may be used to find the target nipple, respectively. In some embodiments, a ported or safety-valve nipple may be used to accommodate wireline or slickline retrievable sub surface safety valves. These nipples may have a locking recess and a hydraulic communication port located between two polished bores. This nipple may feature an integral control line connection port which a sub-surface safety valve may be operated.

Figure 21:
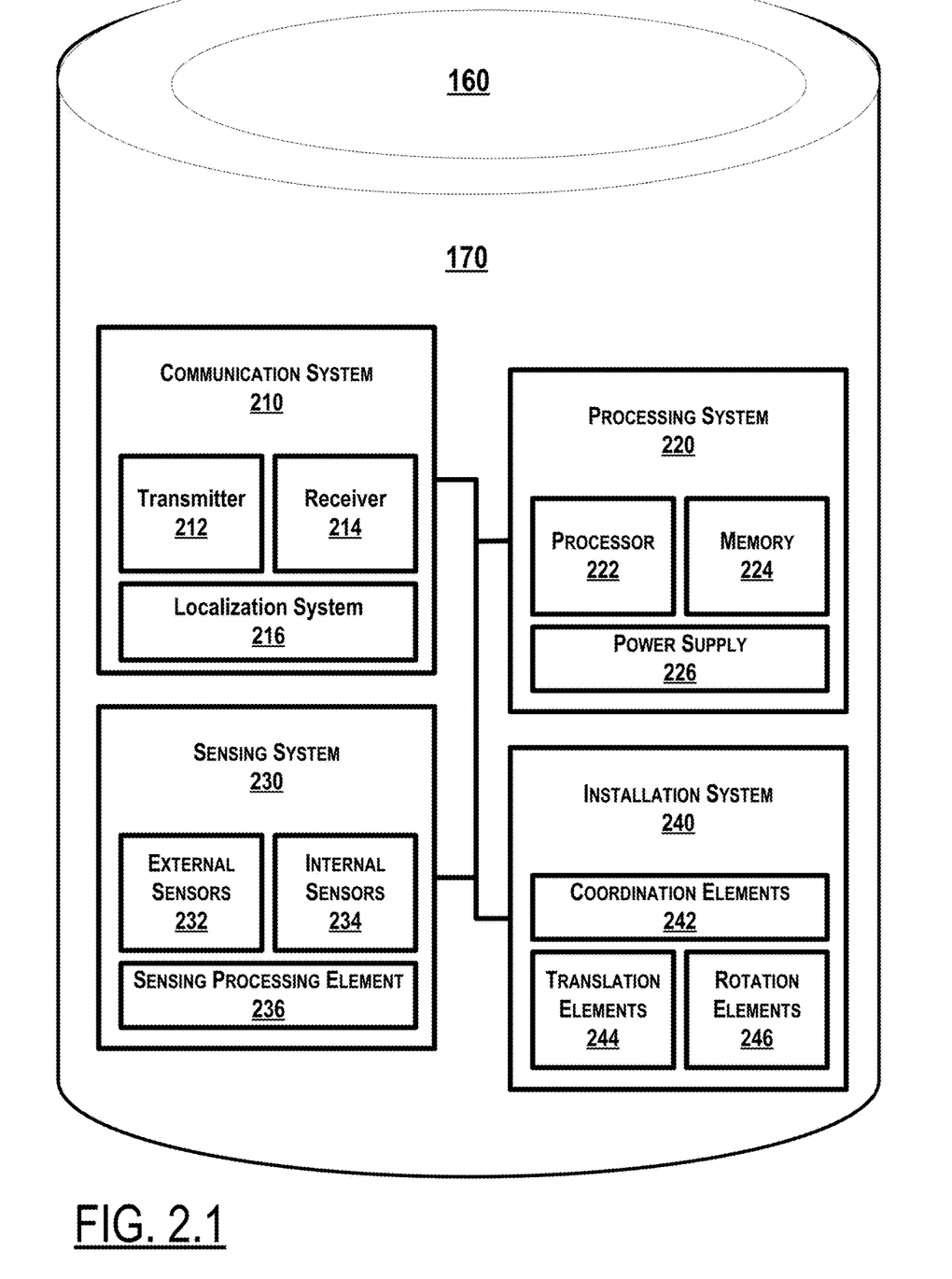

FIG. 2.1 shows a schematic diagram showing various systems disposed in the device 170. In some embodiments, the device 170 includes embedded electronic components that enable the device 170 to perform communication functions, data collecting functions, and/or processing functions. In some embodiments, the electronic components may be temperature and pressure sensors, batteries, wireless communication capabilities and/or instrumentation capabilities. In some embodiments, one or more batteries are embedded in the device 170 to provide the pass-through data acquisition system 100 with maximum power life and operation energy consumption. In some embodiments, various data collecting sensors, a transmitter, and a receiver are also embedded in the device 170. The various collecting sensors may collect data relating to the wellbore 130 and surrounding conditions of the device 170. The transmitter and the receiver may use available, or existing, supervisory control and data acquisition (SCADA) platforms to link the device 170 to a surface panel and retrieve any data collected.

In particular, FIG. 2.1 shows a schematic including different components of the device 170. In some embodiments, the device 170 includes communication system 210, processing system 220, sensing system 230, and installation system 240. The communication system 210 may include communication devices such as a transmitter 212, a receiver 214, and localization system 216. The transmitter 212 and the receiver 214 may transmit and receive communication signals, respectively. Specifically, the transmitter 212 and the receiver 214 may communicate with one or more control systems located at a remote location. The transmitter 212 and the receiver 214 may communicate wirelessly using a wide range of frequencies. In particular, high or ultrahigh frequencies (i.e., between 10 KHz to 10 GHz) may be implemented. The localization system 216 may include one or more geospatial location identification components that collect information associated with a geospatial location of the device 170 or the intervention tool 150.

The processing system 220 may include a processor 222, a memory 224, and a power supply 226. The power supply 226 may be a battery or wired connection for providing electrical energy to the device 170. In some embodiments, the battery is charged using electrical connectors (not shown). The processor 222 may perform computational processes simultaneously and/or sequentially. The processor 222 may determine information to be transmitted and processes to be performed using information received or collected. Similarly, the processor 222 may control collection and exchange of geospatial information through the localization system 216.

The sensing system 230 may include external sensors 232, internal sensors 234, and sensing processing element 236. The external sensors 232 may be sensors that collect physical data from the environment surrounding the device 170 (i.e., sensing production flow). The internal sensors 234 may be sensors that collect physical data from the device 170 itself (i.e., internal temperature, internal pressure, or internal humidity). The external sensors 232 and the internal sensors 234 may be lightweight sensors requiring a small footprint. These sensors may exchange information with each other and supply it to the processor 222 for analysis. The sensing processing element 236 may be a logging tool of an electrical type, a nuclear type, a sonic type, or another type. The sensing processing element 236 may release signals (i.e., electrical, nuclear, or sonic) through a signal generator at a sensing portion The sensing processing element 236 may collect signal feedback generated through a pulse reflection via the sensing portion. The sensing processing element 236 may use the signals to identify and track production fluids going through the central aperture 160 of the device 170. The processor 222 may identify trends, characteristics or properties (i.e., such as pressure or temperature changes) relating to the flow of production fluids in the well. The power supply 226 may be operationally connected to the sensing system 230 and including connections (not shown) for collecting energy and producing electrical energy as a result.

The installation system 240 may include coordination elements 242, translation elements 244, and rotation elements 246. The translation elements 244 and the rotation elements 346 may be mechanisms that identify and track the positioning of the device 170 with respect to the tubing nipple 180 and/or the intervention tool 150 in a three-dimensional (3D) space.

Figure 22:
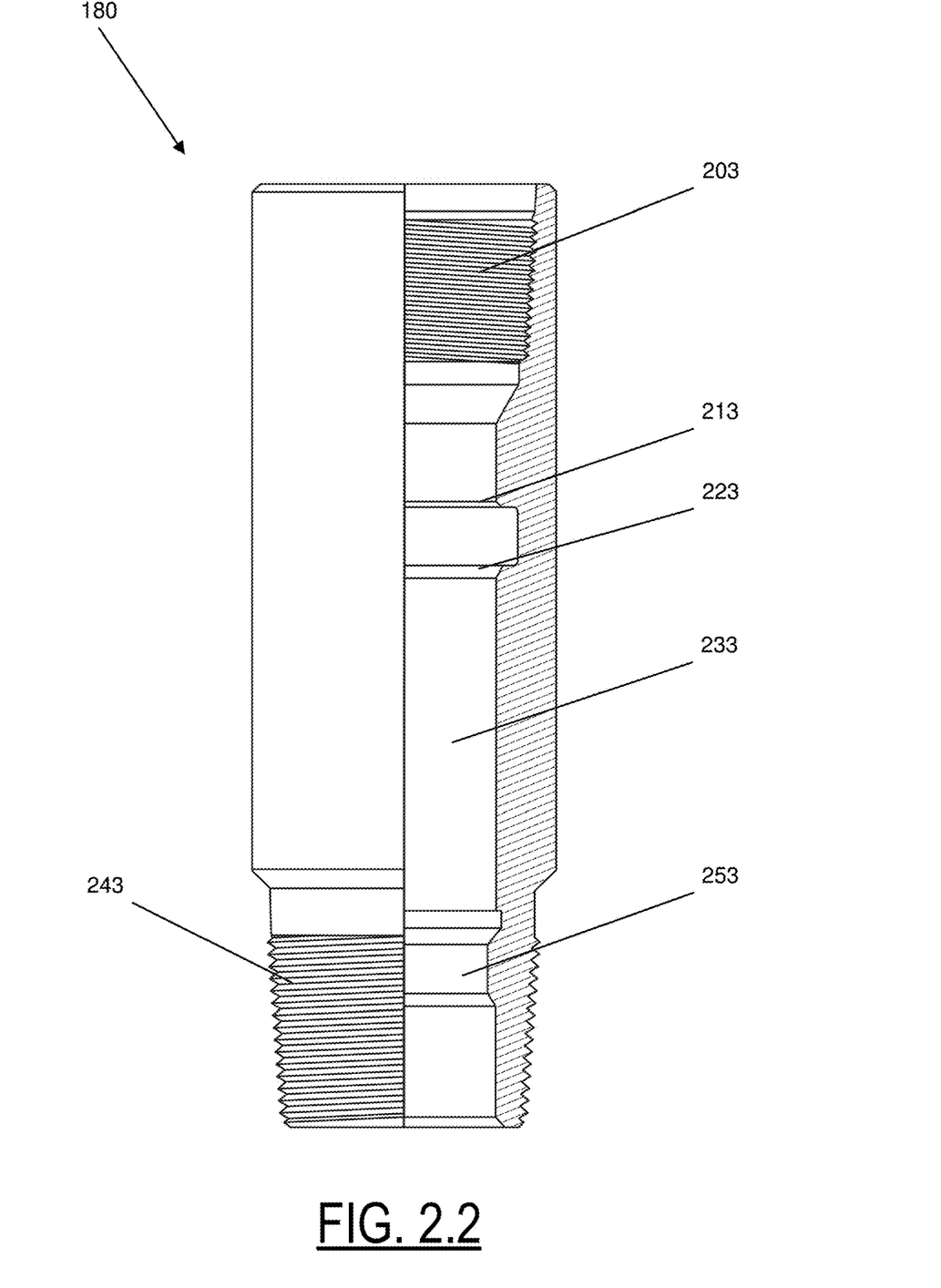

FIG. 2.2 illustrates a perspective, cut-away view of an embodiment of the tubing nipple 180. In some embodiments, the tubing nipple 180 is a short section of heavy wall tubular forming a nipple casing 223. In some embodiments, the tubing nipple 180 is a selective nipple including an internal threaded connection 203 and an external threaded connection 243 for threading into portions of the tubing 110. In some embodiments, the internal threaded connection 203 and the external threaded connection 243 are disposed at distal longitudinal ends of the nipple casing 223 to connect the tubing nipple 180 to the tubing 110 on each distal end. In some embodiments, the tubing nipple 180 includes an upper honed area 213, a lower seal area 233, and a flow coupling profile 253 that define a seat or a locking profile for holding the device 170. In some embodiments, the cylindrical housing 165 includes a housing mounting structure (e.g., base of the cylindrical housing 165) that selectively engages the locking profile of the tubing nipple 180. In some embodiments, the flow coupling profile 253 may have a length between 2.813 inches and 3.813 inches. In some embodiments, the tubing nipple 180 may receive an anchor coupled to the device 170 to hang the device 170 at a different depth below the depth of the tubing nipple 180 along the tubing 110.

Figure 23:
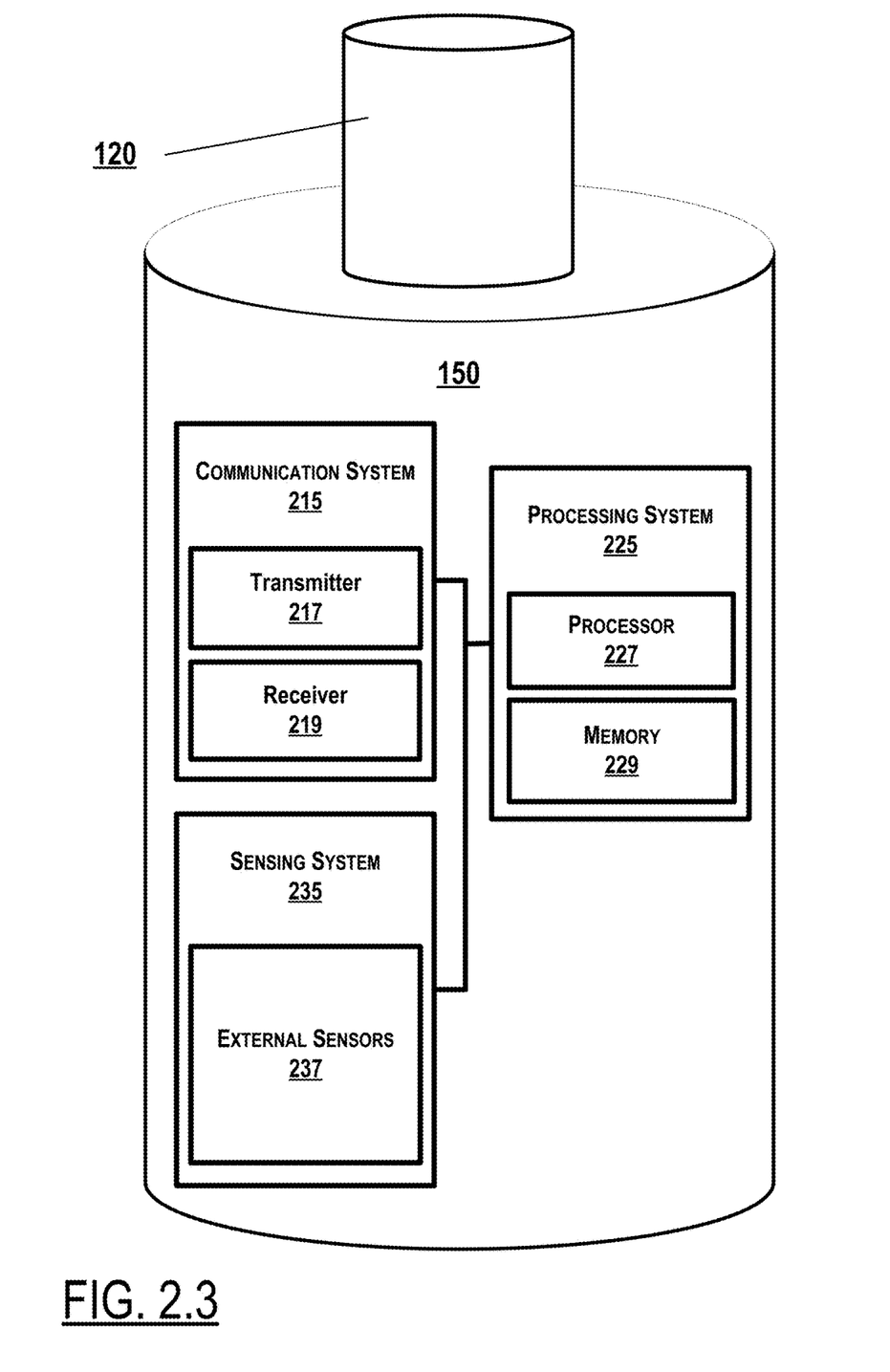

FIG. 2.3 shows a schematic diagram showing various systems that may be incorporated into the intervention tool 150. In some embodiments, the intervention tool 150 includes electronic components that enable the intervention tool 150 to perform communication functions, data collecting functions, and/or processing functions. In some embodiments, the electronic components in the intervention tool 150 may be similar to the electronic components of the device 170 described in reference to FIG. 2.1. In some embodiments, the intervention tool 150 includes communication system 215, processing system 225, and sensing system 235. The communication system 215 may include communication devices such as a transmitter 217 and a receiver 219. The transmitter 217 and the receiver 219 may transmit and receive communication signals, respectively. Specifically, the transmitter 217 and the receiver 219 may communicate with one or more control systems located at a remote location through a wired connection. In some embodiments, the communication system 215 may communicate wirelessly with the communication system 210 of the device 170. In some embodiments, the communication system 215 may act as a relay to transfer information from the device 170 to a control system located at the surface.

The processing system 225 may include a processor 227 and a memory 229. The processor 223 may perform computational processes simultaneously and/or sequentially. The processor 223 may determine information to be transmitted and processes to be performed using information received or collected. Similarly, the processor 223 may control collection and exchange of geospatial information from the device 170.

The sensing system 235 may include external sensors 237. The external sensors 237 may be sensors that collect physical data from the environment surrounding the intervention tool 150 (i.e., sensing conditions in the tubing 110). The external sensors 237 may be lightweight sensors requiring a small footprint. These sensors may exchange information with each other and supply it to the processor 227 for analysis. The external sensors 237 may be logging tools of an electrical type, a nuclear type, a sonic type, or another type. The external sensors 237 may release signals (i.e., electrical, nuclear, or sonic) through a signal generator at a sensing portion.

In other embodiments, the tool 150 may additionally include or be limited to any mechanisms or functional capabilities to perform well workover and intervention via wireline and slickline as are known in the art.

Figure 3:
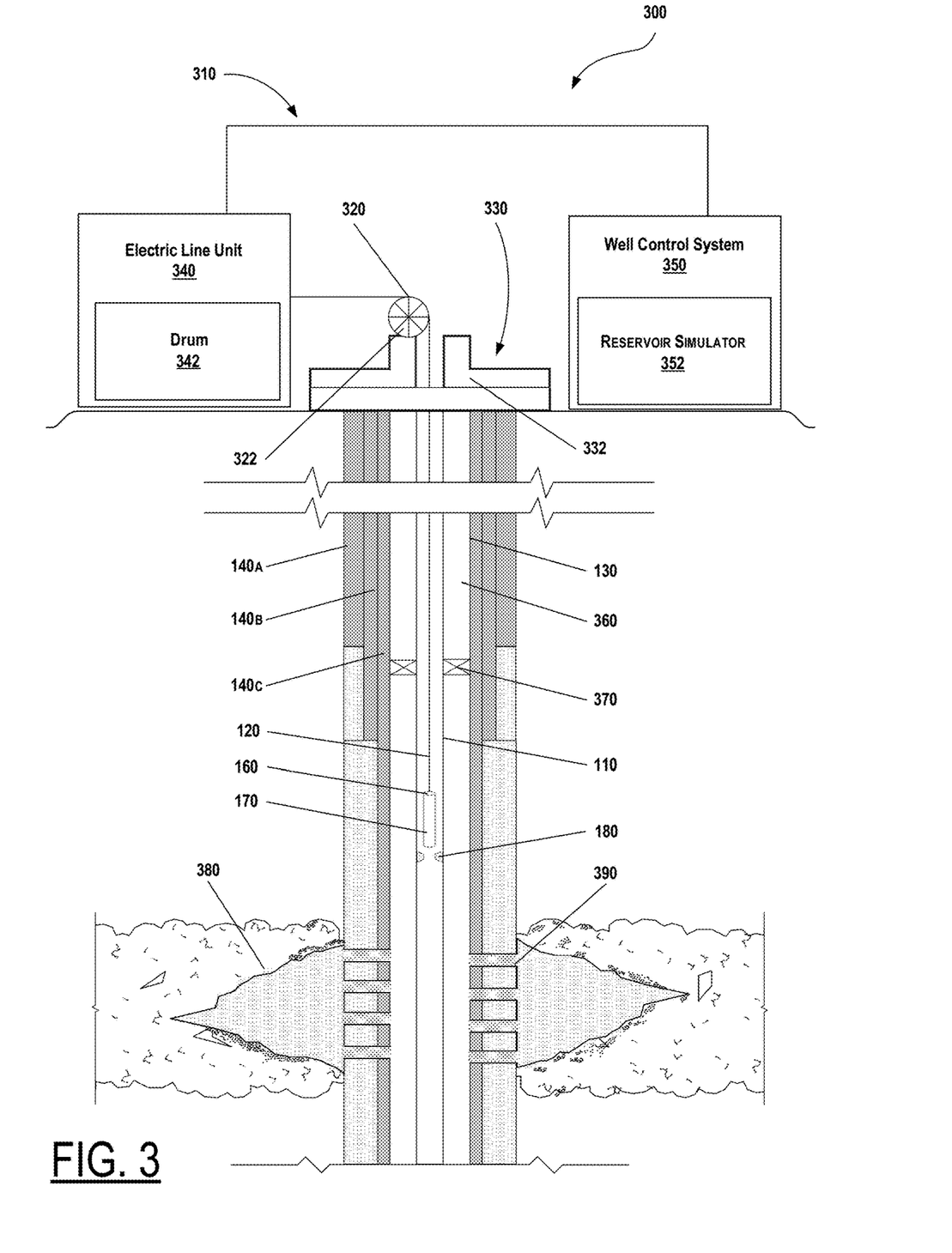
FIG. 3 shows an example of a well system in accordance with one or more embodiments.

FIG. 3 shows an example of the device 170 being installed in a well system 300. In some embodiments, the device 170 is lowered into the wellbore 130 using the conveyance mechanism 120 rolled from a top 320 of a well 310. In some embodiments, the conveyance mechanism 120 is rolled by a spool 322 coupled to a drum 342 located in an electric line unit 340. The spool 322 and the drum 342 operate to lower or raise the conveyance mechanism 120. In this case, the spool 322 and the drum 342 are used for lowering the device 170 into the tubing nipple 180. In some embodiments, the electric line unit 340 includes controls for monitoring and operating the movement of the drum 342 using a hydraulic pump (not shown).

The well system 300 includes the well 310 extending below the earth surface into a subsurface formation ("formation") 380. The formation 380 may include a porous or fractured rock. A subsurface pool of hydrocarbons, such as oil and gas, also known as a reservoir, may be located in the formation 380. The well 310 includes a wellbore 130 that extends from a wellhead 330 at the surface to a target zone in formation 380—the target zone may be where the reservoir (not shown separately) is located. Well 310 may further include casings 140A-140C lining the wellbore 130. In the illustrated example, casings 140A-140C extend into the portion of wellbore 130 penetrating formation 380. One or more perforations 390 may be formed in casings 140A-140C to allow fluid communication between formation 380 and well 310. In other implementations, the portion of wellbore 130 penetrating formation 380 may be uncased or open, and fluid communication between formation 380 and well 310 may occur through the open wall section of the well 310.

In one example, the tubing 110 may be disposed in the well 310 to convey fluid out of the well 310. The tubing 110 may extend downward into the casings 140A-140C from seals 332 disposed at the wellhead 330. An annulus 360 is formed between tubing 110 and the innermost casing. One or more packers 370 may be disposed in the annulus 360, between casing 145 and tubing 110, to isolate the zone in which fluid is injected into or received from formation 380. If there is a clear path between formation 380 and the bottom opening of tubing 110, fluid may flow from formation 380 into tubing 110 for production or from tubing 110 into formation 380 for injection.

The wellbore 130 may facilitate the circulation of drilling fluids during drilling operations. The flow of hydrocarbon production ("production") (e.g., oil and gas) from the reservoir to the surface during production operations, the injection of substances (e.g., water) into the formation 380 or the during injection operations, or the communication of monitoring devices (e.g., logging tools or logging devices) into the formation 380 or the reservoir during monitoring operations (e.g., during in situ logging operations).

The well system 300 may include a well control system ("control system") 350. In some embodiments, during operation of the well system 300, the control system 350 may collect and record wellhead data for the well system 300. The control system 350 may include flow regulating devices that are operable to control the flow of substances into and out of wellbore 130. For example, well control system 350 may include one or more production valves (not shown separately) that are operable to control the flow of production in the well system 300 during well completion operations, well maintenance operations, and reservoir monitoring, assessment and development operations. In some embodiments, prior to installation, the device 170 may be paired with the well control system 350 such that the well control system 350 may retrieve collected data from the device 170. In some embodiments, the well control system 350 includes the surface panel described in reference to FIG. 1.

The well control system 350 may include a reservoir simulator 352. The reservoir simulator 352 may include hardware and/or software with functionality for generating one or more reservoir models regarding the formation 380 and/or performing one or more reservoir simulations. The reservoir simulator 352 may perform production analysis and estimation. Further, the reservoir simulator 352 may include a memory for storing well logs and data regarding core samples for performing simulations. While the reservoir simulator 352 is shown at a well site, the reservoir simulator 352 may be located away from the well site. In some embodiments, the reservoir simulator 352 may include a computer system disposed to estimate a depth above the packer 370 in which the tubing nipple 180 is connected. The reservoir simulator 352 may use the memory for compiling and storing historical data about the well 310. The historical data may be information including reservoir depth, well production rate, packer depth, and/or casing depth.

Figure 4:
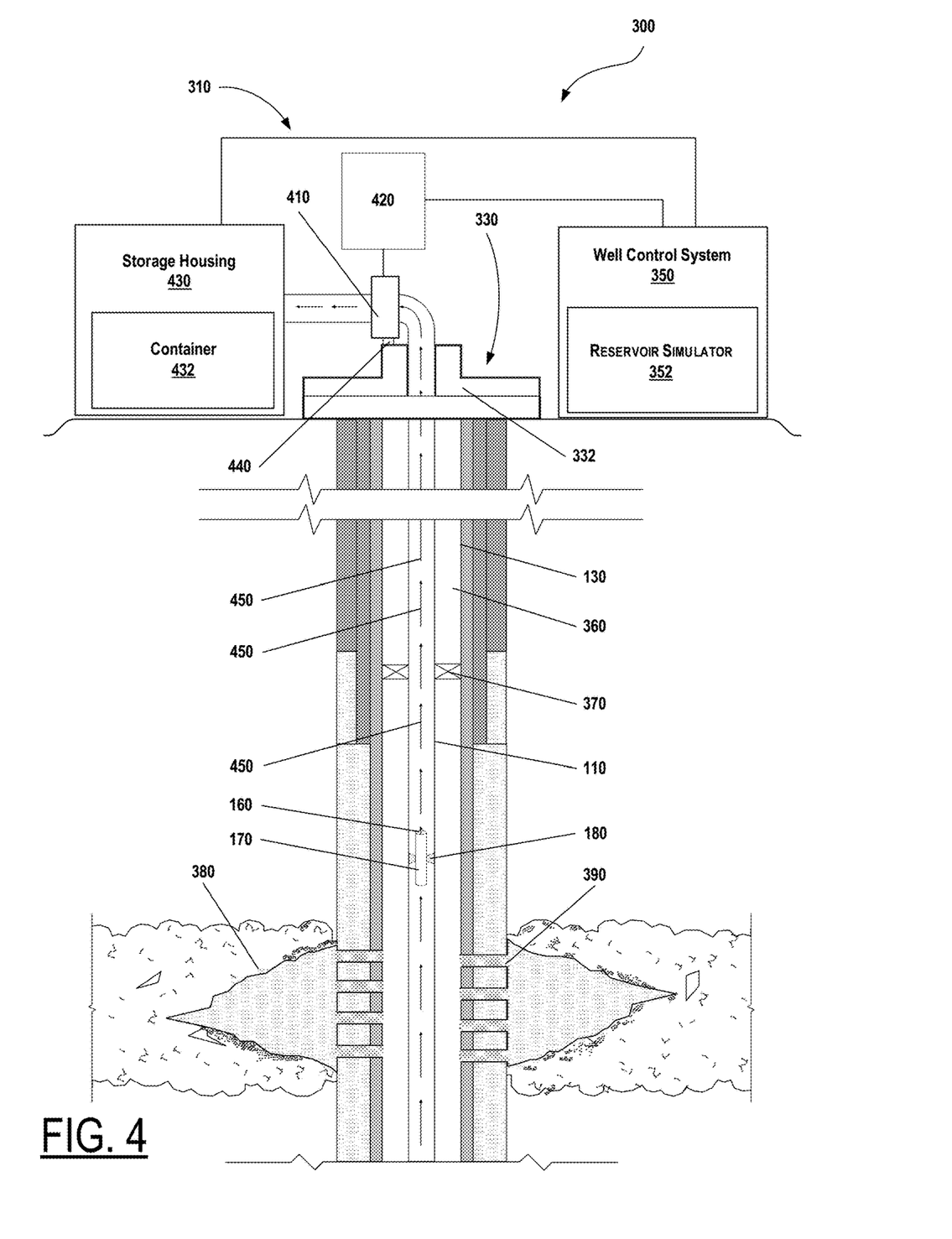
FIG. 4 shows an example of a well system in accordance with one or more embodiments.

FIG. 4 illustrates an example of the well 310 with the device 170 installed in the tubing nipple 180 of the tubing 110. In this case, the device 170 allows for fluids to move up or down the tubing across the central aperture 160 such that fluid may move along or against a direction 450. In some embodiments, the well system 300 may include various pumps 410 installed near the wellhead 330 for pumping material in or out of the well 310. The pumps 410 may include connections to a port 440 and the well control system 350. A storage housing 430 may be coupled to the pumps 410 for storing one or more types of materials used at, or collected from, the well 310. The storage housing 430 may include storage tanks or containers 432 with hydrocarbons extracted from the well 310. The schematic diagram illustrates the well system 300 including connections from the wellhead 330 to the pumps 410. Further, the storage housing 430 may be disposed near the well system 300 or at a distance from the well 310.

The well control system 350 may be coupled to sensors 420 to sense characteristics of substances in storage housing 430, including production, passing through or otherwise located in the well system 300. The sensors 420 may include a surface pressure sensor operable to sense the pressure of production flowing to the well control system 350, after it exits the wellbore 130. Further, for example, the sensors 420 may include a surface temperature sensor including, for example, a wellhead temperature sensor that senses a temperature of production flowing through or otherwise located in the wellhead, referred to as the "wellhead temperature" ($T_{wh}$). In some embodiments, for example, the sensors 420 include a flow rate sensor operable to sense the flow rate of production flowing through the well control system 350, after it exits the wellbore 130. The flow rate sensor may include hardware that senses the flow rate of production ($Q_{wh}$) passing through the wellhead.

In some embodiments, the measurements are recorded in real-time, and are available for review or use within seconds, minutes or hours of the condition being sensed (e.g., the measurements are available within 1 hour of the condition being sensed). In such an embodiment, the wellhead data may be referred to as "real-time" wellhead data. Real-time data may enable an operator of the well system 300 to assess a relatively current state of the well system 300, and make real-time decisions regarding development of the well system 300 and the reservoir, such as on-demand adjustments in regulation of production flow from the well 310.

Figure 5:
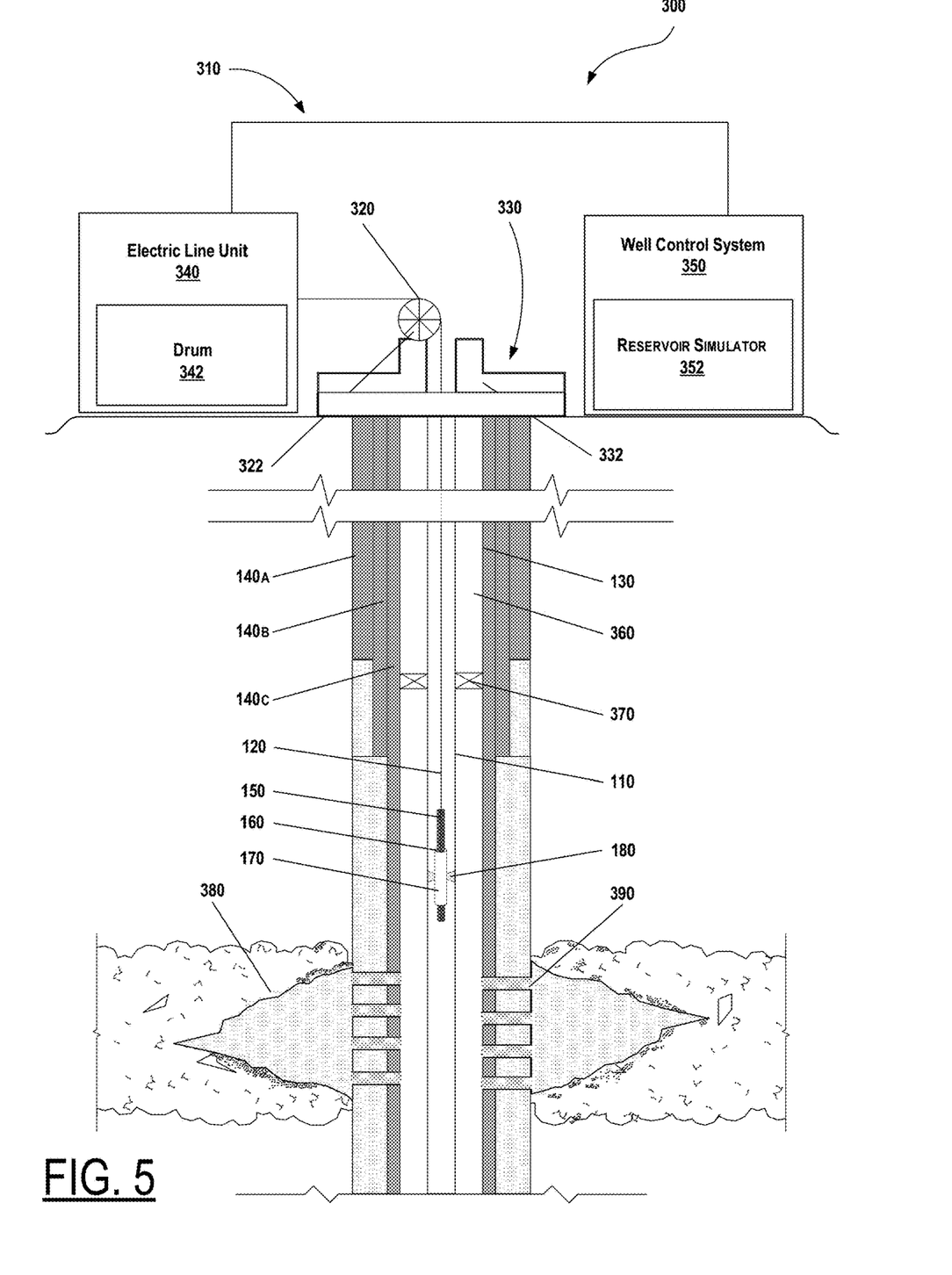
FIG. 5 shows an example of a well system in accordance with one or more embodiments.

FIG. 5 shows an example of an intervention tool 150 being lowered into the device 170 in the well system 300. The intervention tool 150 may be lowered into the wellbore 130 using the conveyance mechanism 120 rolled from the top 320 of the well 310. In some embodiments, the conveyance mechanism 120 is rolled by the spool 322 coupled to the drum 342 located in the electric line unit 340. The spool 322 and the drum 342 operate to lower or raise the conveyance mechanism 120. In this case, the spool 322 and the drum 342 are used for lowering the intervention tool 150, through the device, to a location within the tubing 110 below the device 170. In some embodiments, the electric line unit 340 includes controls for monitoring and operating the movement of the drum 342 using a hydraulic pump (not shown).

The well system 300 may include the well control system 350. In some embodiments, during operation of the well system 300, the control system 350 may collect and record data from the intervention tool 150. The control system 350 may be coupled to intervention tool 150 to sense characteristics of substances in the wellbore 130. In some embodiments, the central aperture 160 of the device 170 allows normal flow of the well 310 and conventional intervention practices that require the intervention tool 150 via the conveyance mechanism 120. In some embodiments, the intervention tool 150 may include temperature sensors, pressure sensors, batteries, instrumentation devices, or wireless communication devices.

In some embodiments, the device 170 allows intervention tool 150 to pass through downhole into the wellbore to acquire real-time downhole wellbore data relevant to hydrocarbon production. The intervention tool 150 transmit collected information to the well control systems 350.

Figure 6:
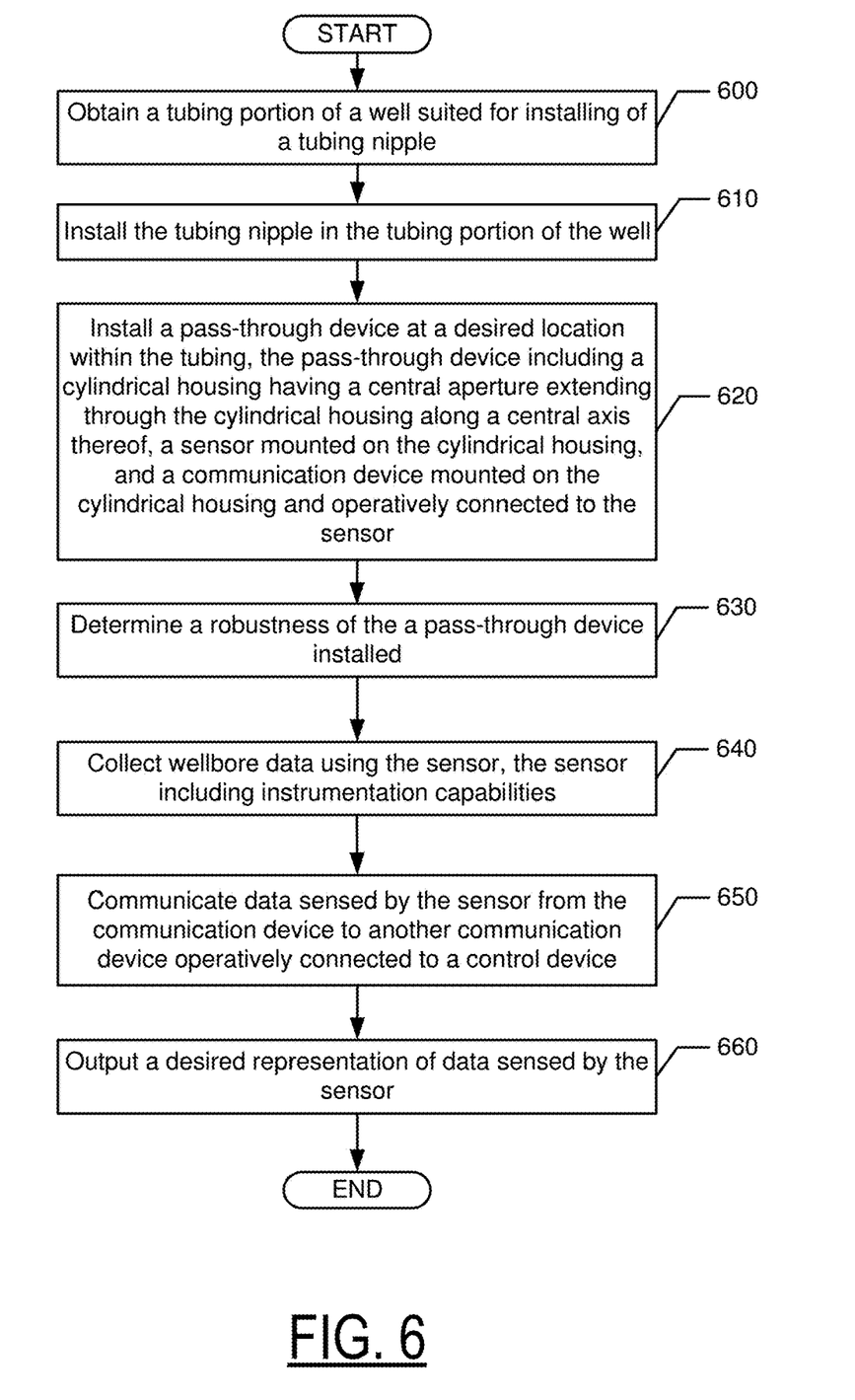
FIG. 6 shows a flowchart in accordance with one or more embodiments.

FIG. 6 shows a flowchart in accordance with one or more embodiments. Specifically, FIG. 6 describes a method for acquiring real-time downhole wellbore data in the well 310 using the well control system 350 and/or the processing system 220 described in reference to FIGS. 1-5. Further, one or more blocks in FIG. 6 may be performed by one or more components as described in FIG. 7 (e.g., computing system 700 including computer processor(s) 704 and communication interface 708). While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 600, the tubing portion 190 of the well 310 suited for installing of the tubing nipple 180 is obtained. The well control system 350 and/or the processing system 220 identifies a portion of the tubing 110 in which the tubing nipple 180 is fitted. The tubing portion 190 is determined to be a location in the tubing 110 allowing access to sensory stimuli relating to the wellbore 130. The tubbing nipple 180 may be installed at a depth near a bottom of the tubing 110, close to the formation 380 to isolate the wellbore 130 and to position the device 170 for measuring reservoir parameters.

In Block 610, the tubing nipple 180 is installed in the tubing portion 190 of the well 310 during completion of the well 310. The installation is performed using adhesives, fastening elements, or threads as part of an upper completion of the tubing 110. Installation may be performed upon completion of the well 310 or upon completion of one or more intervention processes.

In Block 620, a pass-through device is installed at a desired location within the tubing 110. In some embodiments, as described above, the pass-through device may be the device 170 described in reference to FIGS. 1-5. The device 170 is installed into the tubing nipple 180, which allows flow of intervention practices in the well 310. The location of the hollow device 170 may be coordinated with the control system 350 and the installation system 240 to determine a proper position of the hollow device 170 into the tubing nipple 180.

In Block 630, a robustness of the device 170 installed may be determined. The device 170 may be tested to be fixed in place. The control system 350 and/or the processing system 220 may perform testing functions based on identifying jittering or movement of the device 170 over a period of time.

In Block 640, wellbore data may be collected using a plurality of sensors including instrumentation capabilities. The sensors may be temperature sensors, data collecting sensors, or pressure sensors directed toward identifying and collecting data in a wellbore 130. The intervention practices may include running tools into the well 310 via conveyance mechanism 120 through the device 170.

In Block 650, data sensed by a sensor in the device 170 is communicated between a communication device in the device 170 to a communication device in the control system 350. The communication may be wireless allowing for the device 170 and the well system 350 to communicate in real-time.

In Block 660, a desired representation of data sensed by the sensor is outputted. The data may be displayed, shared, compiled, or stored based on a current configuration of the control system 350. Accordingly, the control system 350 may be connected to one or more devices configured to output the data in a desired format.

Embodiments of the invention may be implemented using virtually any type of computing system, regardless of the platform being used. In some embodiments, the well control system 350 and/or the processing system 220 may be computer systems located at a remote location such that data collected is processed away from the well 310. In some embodiments, the reservoir simulator 352 may be fully implemented in a computer system. In some embodiments, the computing system may be implemented on remote or handheld devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 7:
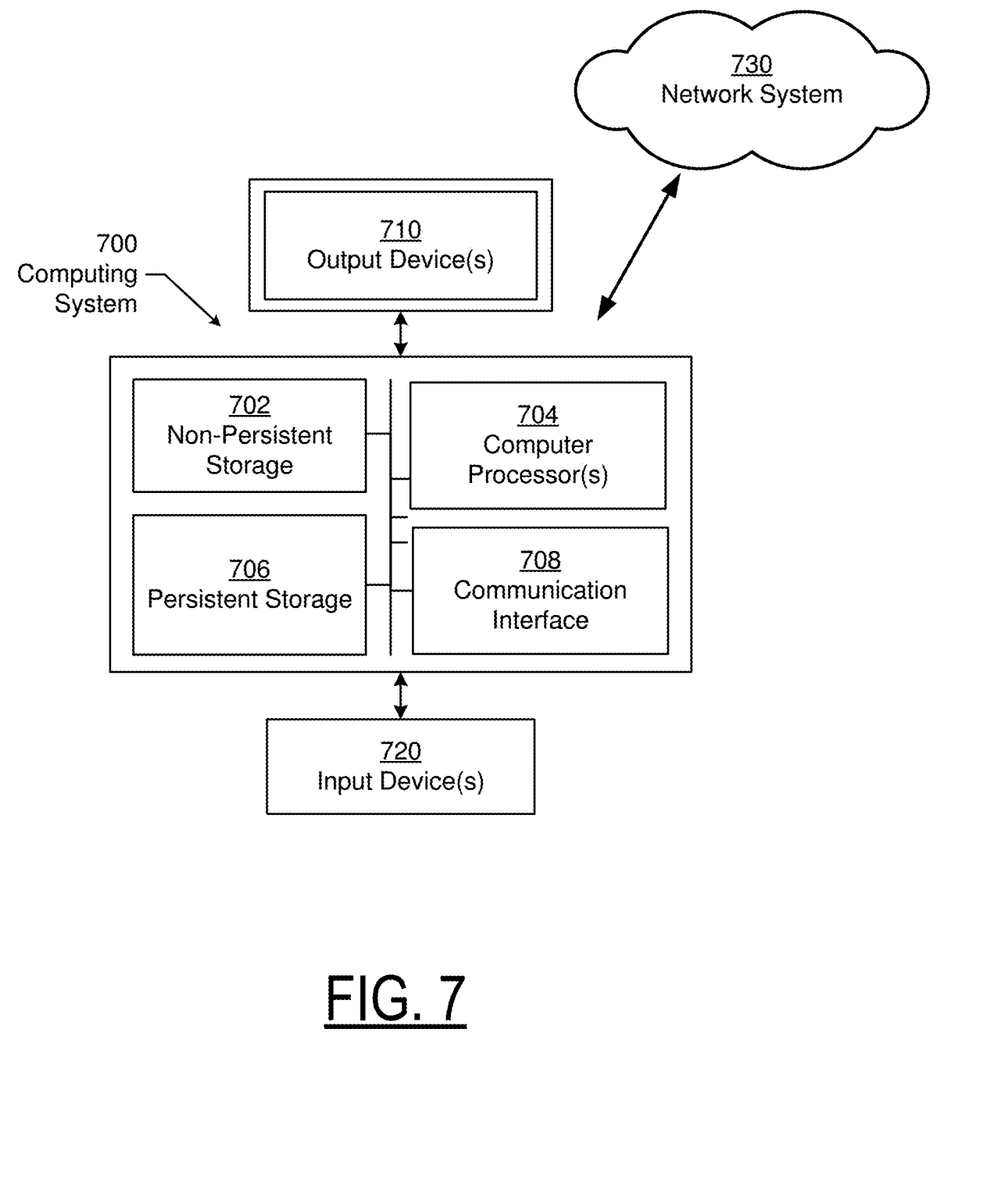
FIG. 7 shows a system in accordance with one or more embodiments.

As shown in FIG. 7, the computing system 700 may include one or more computer processor(s) 704, non-persistent storage 702 (e.g., random access memory (RAM), cache memory, or flash memory), one or more persistent storage 706 (e.g., a hard disk), and numerous other elements and functionalities. The computer processor(s) 704 may be an integrated circuit for processing instructions. The computing system 700 may also include one or more input device(s) 720, such as a touchscreen, keyboard, mouse, microphone, touchpad, electronic pen, or any other type of input device. In some embodiments, the one or more input device(s) 720 may be the surface panel described in reference to FIGS. 1 and 3-5. Further, the computing system 700 may include one or more output device(s) 710, such as a screen (e.g., a liquid crystal display (LCD), a plasma display, or touchscreen), a printer, external storage, or any other output device. One or more of the output device(s) may be the same or different from the input device(s). The computing system 700 may be connected to a network system 730 (e.g., a local area network (LAN), a wide area network (WAN) such as the Internet, mobile network, or any other type of network) via a network interface connection (not shown).

Further, one or more elements of the aforementioned computing system 700 may be located at a remote location and be connected to the other elements over the network system 730. The network system 730 may be a cloud-based interface performing processing at a remote location from the well site and connected to the other elements over a network. In this case, the computing system 700 may be connected through a remote connection established using a 5G connection, such as a protocols established in Release 15 and subsequent releases of the 3GPP/New Radio (NR) standards.

The computing system in FIG. 7 may implement and/or be connected to a data repository. For example, one type of data repository is a database. A database is a collection of information configured for ease of data retrieval, modification, re-organization, and deletion. In some embodiments, the database includes wellbore collected data and production historical data relating to the well 310 as described in reference to FIGS. 3-5.

While FIGS. 1-7 show various configurations of components, other configurations may be used without departing from the scope of the disclosure. For example, various components in FIG. 7 may be combined to create a single component. As another example, the functionality performed by a single component may be performed by two or more components.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A system for acquiring data in a well having a tubing placed therein, the system comprising:
    a pass-through device comprising:
        a cylindrical housing having a central aperture extending through the cylindrical housing along a central axis thereof,
        a first sensor mounted on the cylindrical housing, and
        a first communication device mounted on the cylindrical housing and operatively connected to the first sensor; and
    a tubing mounting structure secured to the tubing and configured to hold the pass-through device at a desired location within the tubing; and
    a control device comprising:
        a second communication device configured to communicate with the first communication device,
        a processor operatively connected to the second communication device, and
        an output device operatively connected to the processor and configured to provide a desired representation of data sensed by the first sensor,
    wherein the tubing mounting structure comprises a pipe section disposed in the well as part of the tubing, the pipe section having an internal threaded connection at one end thereof and an external threaded connection at an opposite end thereof,
    wherein the tubing mounting structure comprises an upper honed area, a lower seal area, and a flow coupling profile, and
    wherein the upper honed area, the lower seal area, and the flow coupling profile together form a locking profile in the tubing.

2. The system of claim 1, wherein communication between the first communication device and the second communication device is wireless communication.

3. The system of claim 1, wherein:
    the cylindrical housing comprises a housing mounting structure configured to selectively engage the locking profile of the tubing mounting structure.

4. The system of claim 1,
    wherein the pass-through device further comprises:
        a memory mounted on the cylindrical housing that stores data collected by the first sensor;
        a processor; and
        a power supply that supplies power to the first sensor, the first communication device, the processor and the memory.

5. The system of claim 1, wherein the pass-through device further comprises a second sensor mounted on the cylindrical housing, wherein the first sensor collects data sensed within the central aperture and the second sensor collects data sensed outside of the cylindrical housing.

6. The system of claim 1, wherein the control device is located outside of the well.

7. The system of claim 1, the system further comprising a tool lowered into the tubing from a surface area of the well, through the pass-through device, to a location within the tubing below the pass-through device.

8. The system of claim 7, wherein the tool comprises a logging device that measures at least one physical parameter.

9. The system of claim 7, wherein the tool comprises a third communication device that communicates wirelessly with the first communication device.

10. The system of claim 9, wherein the communication between the first communication device and the second communication device is via the third communication device.

11. A method for acquiring data in a well having a tubing placed therein, the method comprising:
    installing a pass-through device at a desired location within the tubing, the pass-through device comprising:
        a cylindrical housing having a central aperture extending through the cylindrical housing along a central axis thereof,
        a first sensor mounted on the cylindrical housing, and
        a first communication device mounted on the cylindrical housing and operatively connected to the first sensor;
    communicating data sensed by the first sensor from the first communication device to a second communication device operatively connected to a control device; and
    outputting a desired representation of data sensed by the first sensor,
    wherein the pass-through device is held at the desired location by a tubing mounting structure secured to the tubing,
    wherein the tubing mounting structure comprises a pipe section disposed in the well as part of the tubing, the pipe section having an internal threaded connection at one end thereof and an external threaded connection at an opposite end thereof,
    wherein the tubing mounting structure comprises an upper honed area, a lower seal area, and a flow coupling profile, and
    wherein the upper honed area, the lower seal area, and the flow coupling profile together form a locking profile in the tubing.

12. The method of claim 11, wherein the communication between the first communication device and the second communication device comprises wireless communication.

13. The method of claim 11, wherein the pass-through device further comprises a second sensor mounted on the cylindrical housing and operatively connected to the first communication device, the method further comprising:
communicating data sensed by the second sensor from the first communication device to the second communication device; and
outputting a desired representation of data sensed by the second sensor.

14. The method of claim 13, wherein the first sensor collects data sensed within the central aperture and the second sensor collects data sensed outside of the cylindrical housing.

15. The method of claim 11, further comprising:
lowering a tool from a surface area of the well, through the pass-through device, to a location within the tubing below the pass-through device.

16. The method of claim 15, wherein the tool comprises a logging device that measures at least one physical parameter.

17. The method of claim 16, wherein the tool comprises a third communication device that communicates wirelessly with the first communication device.

18. The method of claim 17, wherein the communication between the first communication device and the second communication device is via the third communication device.

19. A pass-through device for acquiring data in a well having a tubing placed therein and for communicating acquired data to a control device, the pass-through device comprising:

a cylindrical housing having a central aperture extending through the cylindrical housing along a central axis thereof and a housing mounting structure configured to selectively engage a tubing mounting structure;
a first sensor configured to collect data sensed inside the central aperture;
a second sensor configured to collect data sensed outside the cylindrical housing;
a processor operatively connected to the first sensor and the second sensor;
a memory that stores data sensed by the first sensor and the second sensor;
a power supply; and
a communication device that communicates data sensed by the first sensor and the second sensor to the control device,
wherein the pass-through device is held by a tubing mounting structure secured to the tubing,
wherein the tubing mounting structure comprises a pipe section disposed in the well as part of the tubing, the pipe section having an internal threaded connection at one end thereof and an external threaded connection at an opposite end thereof,
wherein the tubing mounting structure comprises an upper honed area, a lower seal area, and a flow coupling profile, and
wherein the upper honed area, the lower seal area, and the flow coupling profile together form a locking profile in the tubing.

20. The pass-through device of claim 19, wherein the central aperture is sized to permit passage of a tool lowered from a surface of the well through the pass-through device to a location within the tubing below the pass-through device.

* * * * *